(12) United States Patent
Welsh (10) Patent No.: US 7,175,935 B2
(45) Date of Patent: Feb. 13, 2007

(54) LITHIUM MANGANESE DIOXIDE CELL

(76) Inventor: John Welsh, Kampstrasse 11, Olsberg (DE) 59939

( * ) Notice: Subject to any disclaimer, the term of this patent is extended or adjusted under 35 U.S.C. 154(b) by 458 days.

(21) Appl. No.: 10/269,119

(22) Filed: Oct. 11, 2002

(65) Prior Publication Data

US 2003/0096157 A1    May 22, 2003

(51) Int. Cl.
*H01M 2/34*    (2006.01)
*H01M 2/08*    (2006.01)
*H01M 2/12*    (2006.01)
*H01M 10/04*    (2006.01)

(52) U.S. Cl. .................. 429/62; 429/56; 429/174; 29/623.2

(58) Field of Classification Search ............ None
See application file for complete search history.

(56) References Cited

U.S. PATENT DOCUMENTS

| | | | |
|---|---|---|---|
| 4,855,195 A | 8/1989 | Georgopoulos et al. ...... 429/54 |
| 4,971,867 A * | 11/1990 | Watanabe et al. ............. 429/61 |
| 5,632,784 A | 5/1997 | Yoon ......................... 29/623.1 |
| 5,677,083 A | 10/1997 | Tomiyama ................... 429/194 |
| 5,747,187 A | 5/1998 | Byon .......................... 429/58 |
| 5,783,326 A | 7/1998 | Hasebe ........................ 429/57 |
| 5,795,674 A | 8/1998 | Shiota ......................... 429/54 |
| 5,958,620 A | 9/1999 | Nagaura ...................... 429/164 |
| 5,985,479 A | 11/1999 | Boolish et al. ................ 429/56 |
| 5,993,990 A | 11/1999 | Kanto et al. .................. 429/62 |
| 6,139,986 A | 10/2000 | Kurokawa et al. ............. 429/61 |
| 6,150,051 A | 11/2000 | Du Pasquier et al. ......... 429/62 |

* cited by examiner

*Primary Examiner*—Jonathan Crepeau
(74) *Attorney, Agent, or Firm*—Seth Natter; Natter & Natter (57) ABSTRACT

A lithium dioxide cell construction including a resettable positive temperature coefficient fuse. The positive temperature coefficient fuse, can withstand shock and mechanical vibration without damage and is mounted in such a way that it cannot be bypassed without destroying the cell. If the cell is shorted out, within a few seconds, the positive temperature coefficient fuse limits the fault current to a low value, which will never allow the cell to overheat or vent.

17 Claims, 7 Drawing Sheets

LITHIUM MANGANESE DIOXIDE CELL

The invention relates to a safe lithium manganese dioxide cell such as an A, C or D cell, particularly for use in a flashlight adapted to meet hazardous material standards and be safely transportable.

The lithium manganese dioxide cell of the present invention can meet all requirements for transport given under the U.N. Recommendations on the Transport of Dangerous Goods: Manual of Test and Criteria (UN Document ST/SG/AC. 10/11)

BACKGROUND OF THE INVENTION

The lithium manganese dioxide cell, as disclosed in U.K. GB 2,222,480, can be made in the form of a commercial cell. The cell has a long shelf life, is compact and provides about 3 Volts.

The lithium electro-chemical cell of the present invention has an anode and a cathode arranged alternately in layers, a separator disposed between adjacent said layers and an organic electrolyte, the anode, cathode and separator having a structure in which the anode, cathode and separator comprise respective strips wound to form a solid spiral winding, and the outermost electrode layer being thinner than the respectively, more inwardly disposed corresponding electrode layers. The separator comprises two layers, a shutdown separator and a glass fiber mat insulator. The organic electrolyte is an organic solvent mixture in which a conducting salt has been dissolved.

At least, the lithium dioxide D cell of the present invention can meet requirements of the UN Recommendations on the Transport of Dangerous Goods: Manual of Test and Criteria (UN Document ST/SG/AC.10/11).

The present invention is an improvement of the Cell of UK Patent No. GB2,222,480. In order to make the lithium manganese dioxide cell safe in a better form for commercial and military use and non-hazardous for transportation, there must be short circuit protection.

Integrated into the cell construction of the present invention is a resettable positive temperature coefficient fuse. The positive temperature coefficient fuse, which can withstand shock and mechanical vibration without damage, is mounted in such a way that it cannot be bypassed without destroying the cell. If the cell is shorted out, within a few seconds, the positive temperature coefficient fuse limits the fault current to a low value, which will never allow the cell to overheat or vent.

If the cell is charged and starts to overheat, the positive temperature coefficient fuse will again switch to a high resistance state and limit the charging current to a value which will prevent overheating and venting.

When the short or the charging voltage is removed, within a few minutes, the positive temperature coefficient fuse recovers and the cell is again fully functional and capable of meeting all the tests given in the UN Manual of Tests and Criteria, Part III, sub-section 38.3.

DESCRIPTION OF THE PRIOR ART

U.S. Pat. No. 6,139,986 discloses a lithium secondary battery including an electricity generating portion in which the positive electrode and negative electrode form a laminate through a separator film made of porous polymer, so that the positive electrode and negative electrode do not come in direct contact with each other and leads are connected to pro-portions of the positive electrode and negative electrode to make electrical connection and a low melting point alloy, serves as a current break mechanism.

U.S. Pat. No. 5,747,187 discloses a lithium battery which can promptly cut off current when it is being overheated by a short, to prevent an explosion. A shaped memory alloy spring made of nickel titanium alloy is included between the cover and the cap, either for making contact with both the cover and the cap to electrically connect the cover with the cap, or for separating from the cap, in the case of overheating the battery.

U.S. Pat. No. 5,677,083 discloses a non-aqueous lithium secondary battery comprising a positive electrode sheet, which comprises a lithium containing transition metal oxide film, a negative electrode sheet, which has a film of material capable of receiving and releasing lithium on ion, a non-aqueous electrolyte which contains a lithium salt and a container which seals the electrodes and electrolyte therein. The lithium containing transition metal oxide film comprises at least two layers, one of which expands during discharging while shrinks during discharging and another which shrinks during discharging while expanding during charging.

U.S. Pat. No. 5,958,620 discloses a method which allows a battery with a flat base to be produced in a cylindrical battery manufacturing method, in which a metallic casing with a larger outside diameter than the outside diameter of the metal casing in the finished battery, is used, a battery element is housed in the metallic casing, then the outside diameter of the metallic reduced, to reduce the occurrence of defective batteries, due to deficient electric conduction between the metallic casing and the electrode lead, and to improve the on an outer cover and facing the seal member, for providing electrical contact between the outer cover and a current path of the cell. Upon reaching a predetermined self pressure, the seal member is forcible released from the vent passage and, at the same time, forcible engages the current interrupt contact to interrupt the flow of contact from within the seal to the outer cover.

U.S. Pat. No. 5,795,674 discloses and improved safety battery, capable of preventing ejection and spraying of the content thereof, when the safety valve has been ruptured, and having a safety valve which cannot be pierced unintentionally.

U.S. Pat. No. 5,783,326 discloses a nonaqueous electrolyte secondary battery including a positive electrode and a negative electrode capable of absorbing/desorbing lithium ions, a nonaqueous electrolyte and a positive Thermal Coefficient.

U.S. Pat. No. 5,632,784 discloses a method of discharging a battery, wherein a stable litigated film is formed at an anode by a small amount of the discharged capacity in order to rapidly recover the open circuit voltage of the battery. A litigated film, which is formed at the anode, while being partially oxidized to lithium ions, is uniformed. A high potential portion can be removed and gas generation reaction can be suppressed.

U.S. Pat. No. 4,855,195 discloses electro-chemical cells, employing a current safety switch member, comprised of a shaped memory alloy or electric circuit in the cell. The collector safety switch member has a base portion and a plurality of legs extending therefrom, and when the internal temperature of the cell rises, the legs of the collector safety switch members are retracted to thereby disconnect the electrical circuit of the cell.

It is respectfully requested that this citation of art consist of record about the within application.

BRIEF SUMMARY OF THE INVENTION

GB patent 2,222,480 provided a lithium manganese dioxide cell that could be of the diameter of the conventional D cell battery. The cell enables much greater use life and amperage. The commercial value of the cell is limited. Any cell having 1 g to 5 g of lithium must pass the tests specified in the UN Recommendations on the Transportation of Dangerous Goods in order to be considered non hazardous for transport. The cell of the GB patent 2,222,480 B with a lithium content of 1 g to 5 g cannot pass this test.

The present invention enables a lithium manganese dioxide cell having 1 g to 5 g of lithium to pass the UN Manual of Test and Criteria, Part III, sub-section 38.3 tests in order to be considered non hazardous for transport.

Although such novel feature or features believed to be characteristic of the invention are pointed out in the claims, the invention and the manner in which it may be carried out may be further understood by reference to the description following and the accompanying drawings.

BRIEF DESCRIPTION OF THE DRAWINGS

Referring now to the figures in greater detail, where like reference numbers denote like parts in the various figures.

DESCRIPTION OF THE PREFERRED EMBODIMENTS

Figures 1, 2:
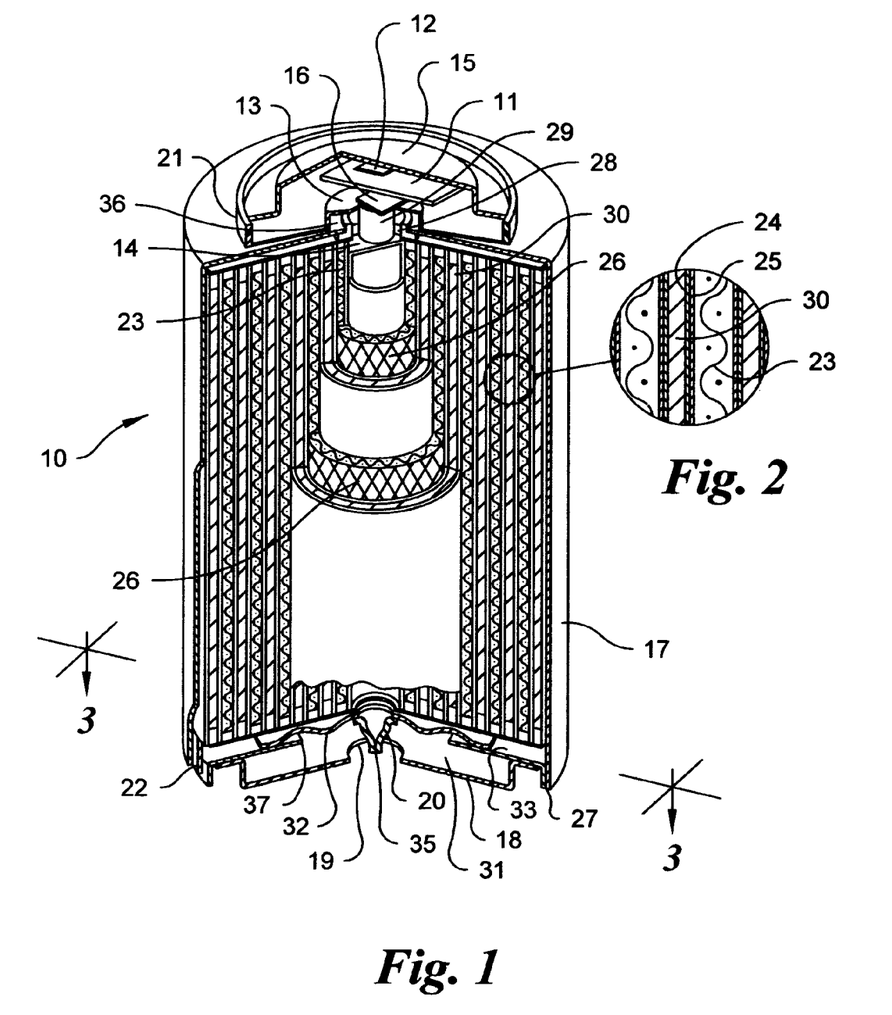
FIG. 1 is a cut-away section of the lithium cell of the present invention.
FIG. 2 is a blown up detail showing the details of the circled portion of FIG. 1.

The lithium cell 10 as shown in FIG. 1 includes a steel can 17 with an upper opening 36 and a lower opening 37 and a support ring 33. There is a positive 15 insulated from the steel can 17 by an insulator 21. Within the positive contact 15 and in contact with it is a first connector 12. The first connector 12 is in contact with a resettable fuse 11. A second connector 16 leads from the resettable fuse 11 to a conductor 13 in a glass to metal seal 29.

The glass to metal seal 29 is engaged in a seal 28 that seals the upper opening 36 of the steel can 17. The conductor 13 is in contact with a cathode tag 14. The cathode tag 14 is in contact with a cathode 23. The cathode 23 includes an aluminum mesh 26.

Figure 5:
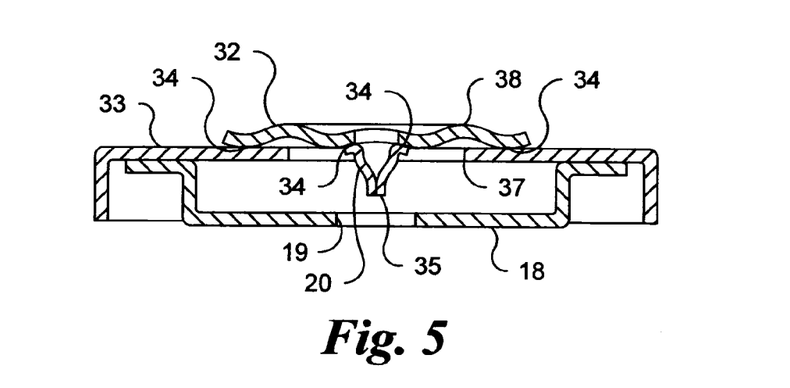
FIG. 5 is a vertical section of FIG. 3 at lines 4—4 showing the crimped and cut filling tube and the negative end cap.

As can be seen in FIG. 2 there is a shutdown separator 24 and an insulator 25 between the cathode 23 and a lithium anode 30. A negative end cap 18 has a round opening 19 near a filling tube 20 as shown in FIGS. 1 and 5. An anode tag 22 extends from the lithium anode 30 to the steel can 17.

Figure 3:
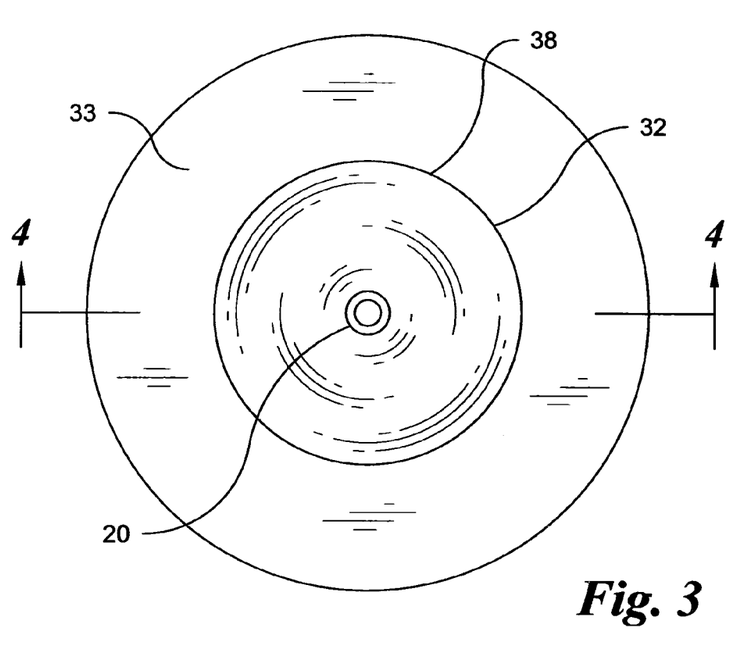
FIG. 3 is detail top plan view of the support ring portion of the lithium cell with a fill tube engaged in a burst seal assembly.
Figure 4:
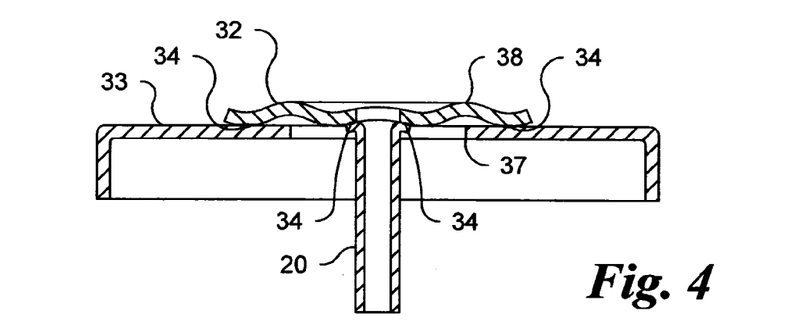
FIG. 4 is a vertical section of FIG. 3 at lines 4—4.

As can be seen in FIGS. 1, 3–5 an integral support ring 33 of the steel can 17 has an opening 37. A pressures relief burst disc assembly 32 is engaged at the support ring 33. The crimped and cut filling tube 35 is shown in FIG. 5. The burst disc assembly 32 is joined to the support ring 33 by a projection weld 34 and the filling tube 20 is joined to the burst disc assembly 32 by a projection weld 34 as shown in FIG. 4.

The filling tube 20 is for the purpose of filling the lithium cell 10 with a preferred electrolyte, such as a mixture of organic solvents and an electrolytic salt in order for the lithium cell 10 to function. Three solvents are propylene carbonate, 1,2 dimethoxyethane, tetrahydrofuran and an electrolytic salt is lithium perchlorate.

The filling tube 20 as shown in FIG. 4, enables the introduction of the electrolyte that is sealed in the lithium cell 10, in a circuit that allows the transfer of the lithium ions from the anode 30 to the cathode 23 during discharge. The insulator 21 electrically insulates the positive contact 15 from the steel can 17 and enables a circuit from the positive contact 15 through the steel can 17 through the negative end cap 18. The circuit passes through the positive contact 15 passing through the first connector 12, the resettable fuse 11 to the second connector 16, through the conductor 13 to the cathode tag 14. The cathode tag 14 engages the cathode 23, as can be seen in FIG. 2, isolated from the lithium anode 30 by the shutdown separator 24 and insulator 25.

The cathode 23 comprises manganese dioxide which is pressed into the aluminum mesh 26.

The filling tube 20 is welded to the burst disc assembly 32 which prevents the uncontrolled rupture of the steel can 17 if it is overheated. For example should the cell be thrown into a fire, the vent will prevent particles being ejected from the fire. A laser weld 27 renders the steel can 17 which is corrosion resistant, hermetically sealed. The lithium anode 30 is connected to the steel can 17 by the anode tag 22 which is fixed in position by a laser weld 27.

The resettable fuse 11, is a positive temperature coefficient fuse which can withstand shock and mechanical vibrations without damage. The resettable fuse 11, is mounted in the construction of the lithium cell 10 so that it cannot be electrically by-passed without destroying the construction of the lithium cell 10.

Figure 6:
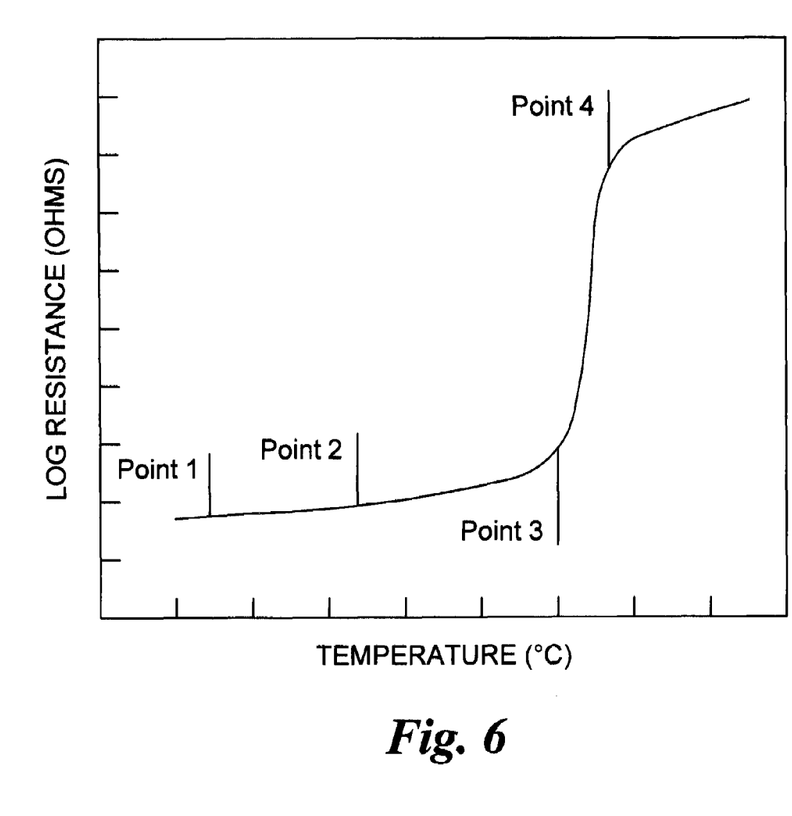
FIG. 6 is a graph showing an example of the operating curve for the selected positive temperature coefficient fuse of the present invention.

If lithium cell 10 is shorted out, the resettable fuse 11 heats up within a few seconds and limits the fault current to a low value which will never allow the lithium cell 10 to overheat or vent as shown in FIG. 6.

Figure 8:
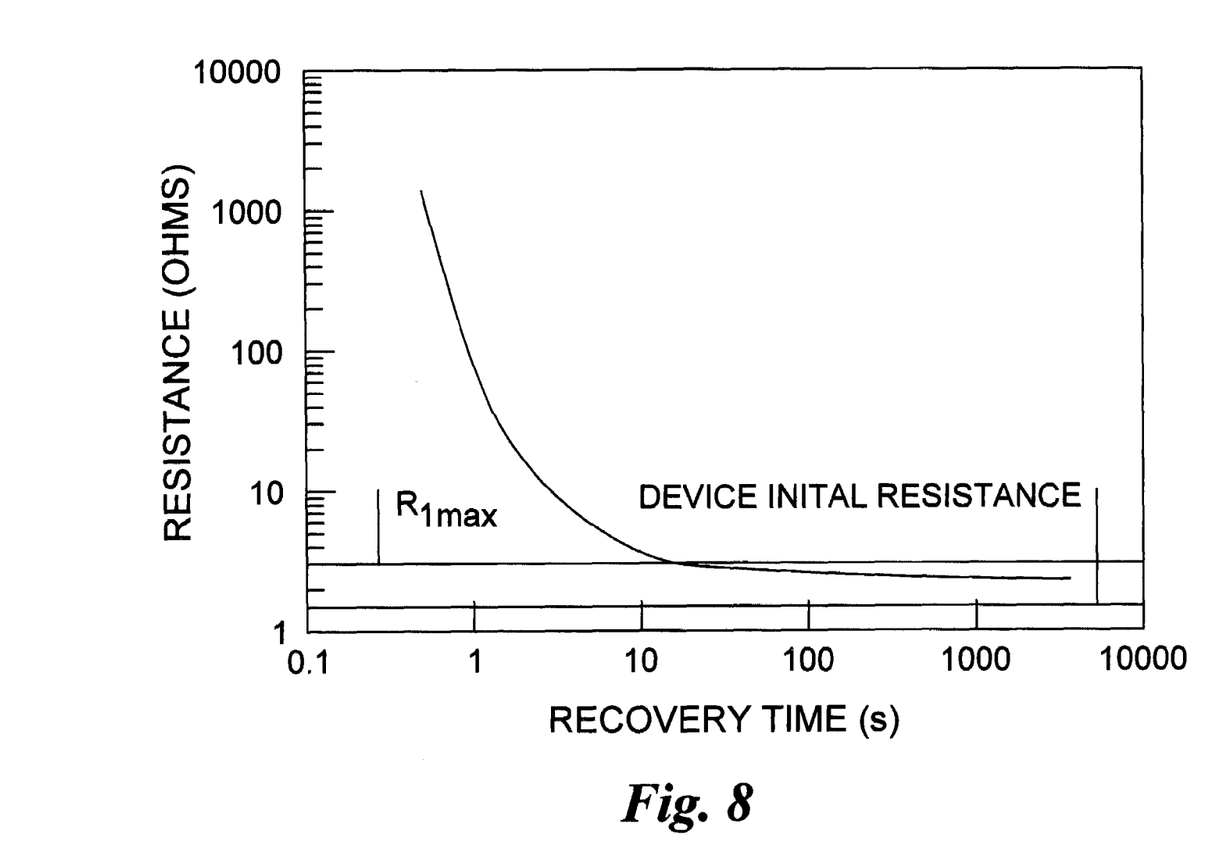
FIG. 8 is a graph showing the typical resistance recovery of the selected positive temperature coefficient fuse of the present invention.

If the lithium cell 10 is charged and starts to overheat the resettable fuse 11 will again switch to a high resistance and limit the charging current to a value which will prevent further overheating and venting. When the short or charging voltage is removed, within a few minutes, the resettable fuse 11 recovers and the lithium cell 10 is again fully functional as shown in FIG. 8.

The resettable fuse 11 of the present invention is a Raychem PolySwitch Ô positive temperature coefficient fuse. It comprises a polymeric material including a matrix of crystalline organic polymer containing dispersed conductive particles, usually carbon black. The resettable fuse 11 of the present invention selected is the SRP200 which has been tested to MIL-STD-883C, Test Condition A.

FIG. 6 shows one example of an operating curve for a positive temperature coefficient fuse such as the resettable fuse 11 used in the lithium cell 10 of the present invention.

The Table I below shows the amperage temperature trip characteristics of the resettable fuse 11 Raychem PolySwitch Ô, SRP200.

TABLE I $I_{hold}$ vs. Temperature

| Current | Maximum internal battery pack operating temperature (° C.) | | | | | | |
|---|---|---|---|---|---|---|---|
| (A) | 40° | 45° | 50° | 55° | 60° | 65° | 70° |
| 1.2 |  |  |  | SRP200 | SRP200 | SRP200 | SRP200 |
| 1.4 | SRP200 | SRP200 |  | SRP200 | SRP200 |  |  |
| 1.6 | SRP200 | SRP200 |  |  |  |  |  |

As the temperature of the resettable fuse 11 increases, between points 3 and 4 of FIG. 6, there is a sharp increase in the resistance over a narrow temperature range. This is due to a phase change in the material in the resettable fuse 11. In the cool state, the material is mostly crystalline with conductive material filling the gaps between the crystals. This gives the resettable fuse 11 a low resistance. When a certain temperature is reached the crystals melt and break up the conductive paths leading to the rapid increase in resistance. The heating of the resettable fuse 11 causes the change of state and the increase in resistance can be due to current flowing through the device or external heating or a combination of both.

The relationship between the operating temperature and the maximum current that the resettable fuse 11 will hold before tripping is set forth in Table II below.

TABLE II

| Part Number | Maximum ambient operating temperature (° C.) versus hold current ($I_{hold}$) | | | | | | | | |
|---|---|---|---|---|---|---|---|---|---|
|  | −40° | −20° | 0° | 20° | 40° | 50° | 60° | 70° | 85° |
| SRP200 | 3.2 | 2.8 | 2.5 | 2.0 | 1.7 | 1.6 | 1.4 | 1.2 | 0.9 |

Even at 70° C., a current of 1.2 A can flow without the resettable fuse 11 tripping. This current is well in excess of the current, for instance in an ordinary D cell flashlight bulb of 600 mA, so there is no risk of the resettable fuse 11 tripping during normal operation.

Figure 7:
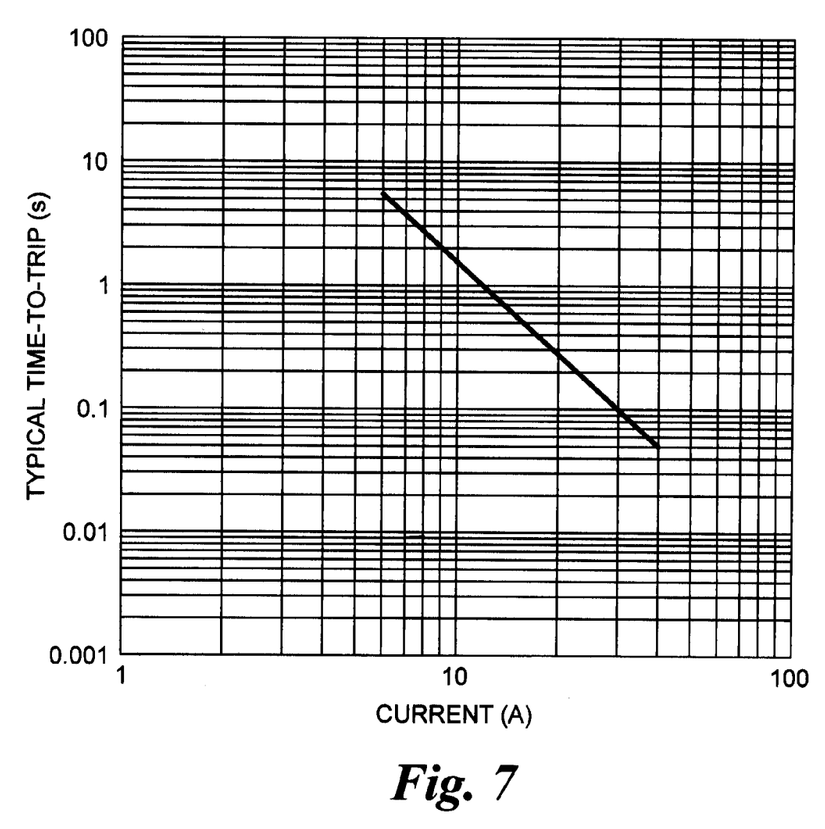
FIG. 7 is a graph showing the typical trip time of the selected positive temperature coefficient fuse of the present invention.

When a short circuit occurs, the typical time to trip is shown by the lines shown in FIG. 7. With a lithium manganese dioxide cell in the form of a cell such as lithium cell 10, if shorted out, the current is typically in excess of 20 A.

In FIG. 7 it can be seen that the resettable fuse 11 typically trips in 0.3 seconds. Such speed of tripping protects the lithium cell 10. Experiments have shown that a D size type lithium cell of the present invention can supply 20 A current for several minutes without damage.

The maximum current which flows once the resettable fuse 11, of the present invention has tripped, is calculated from $P_d$ max, as shown in Table III below, which gives a figure of 1.9 W. The resistance of the resettable fuse 11 after it has tripped, $R_1$ is given by the formula $V^2/P_d$ where V is the voltage applied by the lithium cell 10, typically 3V. Therefore, $R_1=9(V^2)/1.9(P_d)=4.7$ Ω, and the current $I_T=3/4.7=0.64$ A

TABLE III

Electrical Characteristics (20° C.)

| Part Number | $I_H$ (A) | $I_T$ (A) | Maximum time-to-trip (sec @ A) | $P_d$ max (W) | Initial resistance R min. (Ω) | Initial resistance R max (Ω) | Post-trip resistance $R_1$ max (Ω) |
|---|---|---|---|---|---|---|---|
| SRP200 | 2.0 | 4.4 | 4.0 @ 10.0 | 1.9 | 0.030 | 0.060 | 0.100 |

$I_H$ = Hold current-maximum current at which the device will not trip at 20° C. still air.
$I_T$ = Trip current-minimum current at which the device will always trip at 20° C. still air.
Time-to-trip = Time needed, from onset to fault condition, to trip a PolySwitch device.
$P_d$ = Maximum power dissipated from device when in the tripped state in 20° C. still air.
R min./R max. = Device resistant at 20° C. prior to tripping.
$R_1$ = Resistance one hour after device is tripped at 20° C.

The lithium cell 10 can supply a current of 0.64 A indefinitely even at a temperature of 60° C. so the resettable fuse 11 provides the necessary protection. If the short of the cell were to remain permanently in place, the cell would eventually become discharged. The important feature is that the user would not be exposed to any hazard.

As shown in FIG. 8 the typical recovery of the resettable fuse 11 is within about 2 minutes. The resistance drops to approximately two times the value it was before the short circuit. In the case of the resettable fuse 11 as shown in Table III above, the maximum resistance is 0.06 Ω. After a short circuit has occurred and then been removed, after full recovery, the post trip resistance would be a maximum of 0.100 Ω as shown in Table III.

In a flashlight with a 0.6 A load, the voltage across the resettable fuse 11 would be no more than 0.072V. Such voltage is relatively insignificant compared to the operating voltage of the manganese dioxide lithium cell 10 of the present invention, which is 3V. The lithium cell 10, fitted with the resettable fuse 11 is protected against a short circuit and can again be used once the short circuit is removed.

The resettable fuse 11 also protects the lithium cell 10 from damage of being mishandled by being subject to a charge. The lithium cell 10 of the present invention can withstand a 2 A charging current without venting. A charging current exceeding this value will actuate the resettable fuse 11 and prevent the lithium cell 10 from venting.

The resettable fuse 11 cannot be by-passed even with mishandling. The insulator 21 between the positive contact 15 and the steel can 17, completely prevents contact between the positive contact 15 and the steel can 17 without excessive force.

The lithium cell 10 of the present invention includes the asymmetrical spiral wound anode safety feature, construction of the electrode pack of GB patent 2,222,480 patent. This construction makes the lithium cell 10 safe in conditions of deep discharge since all the lithium metal is consumed.

The UN Manual of Tests and Criteria, Part III, sub-section 38.3 Internal Short Circuit Test, T4 which must be passed for the lithium cell 10 to be declared non-hazardous requires that the lithium cell 10 be crushed until an internal short circuit is produced. If a lithium manganese dioxide D cell of the U.K. GB 2,222,480 design were subjected to said T4 test, there is a small probability that the cell could overheat and start a chain reaction which provides further heating which in turn could allow the electrolyte catch fire.

The shutdown separator 24 of the present invention as shown in FIG. 2, effectively prevents a fire occurring. The shutdown separator 24 used is a Celgard 2300®. The shutdown separator 24 is a thin opaque, uniformly microporous flat sheet membrane made from food grade polypropylene and polyethylene resins manufactured by Hoechst Celanese Corporation.

Figure 9:
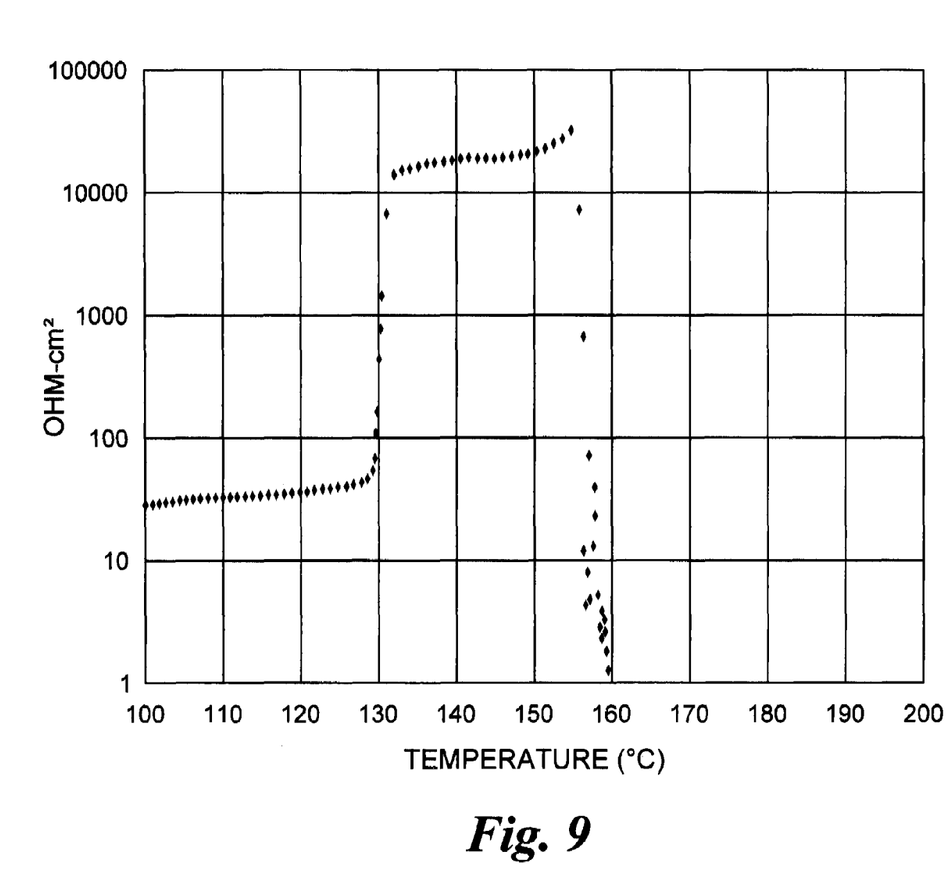
FIG. 9 is a graph showing temperature and resistivity of the shut-down separator.

As shown in FIG. 9 at about 130° C., material in the shutdown separator 24 turns to a non-porous state and the electrical resistivity of the material increases by three orders of magnitude and effectively prevents lithium ions from reaching the cathode of the lithium cell 10. The lithium cell 10 is shut down.

Figure 10:
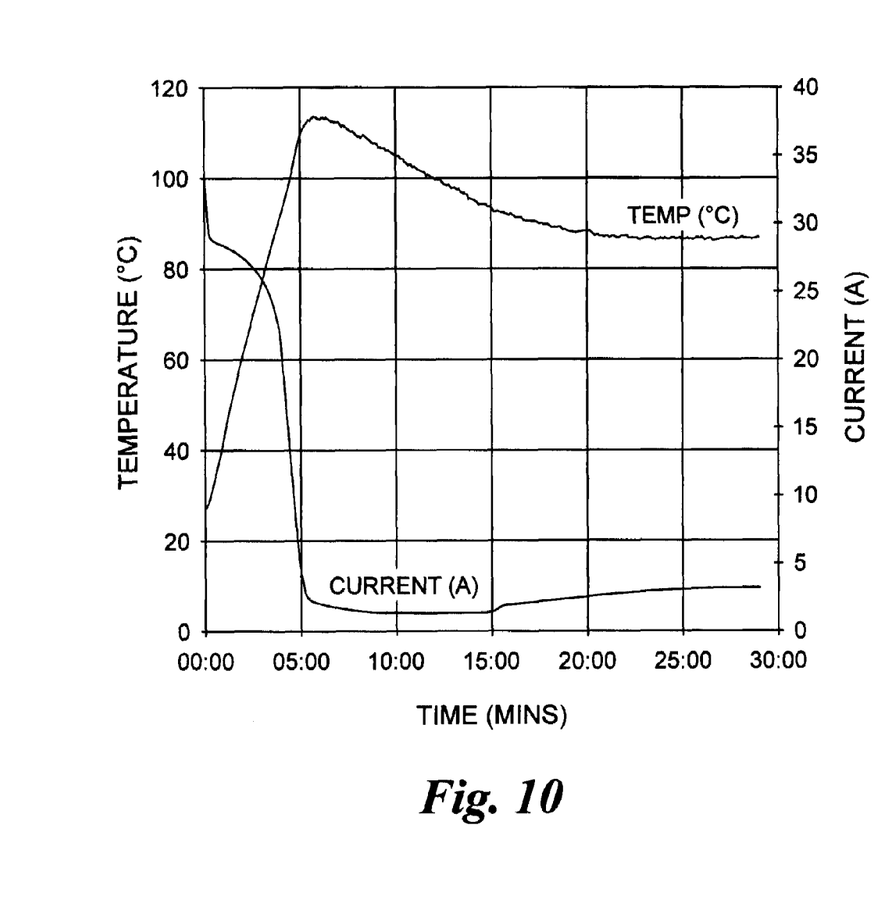
FIG. 10 is a graph showing the effectiveness of the shut-down separator with an external short circuit.

FIG. 10 shows the effectiveness of the shutdown separator 24 with an external short circuit applied to a lithium manganese dioxide lithium cell 10 of the present invention. When the steel can 17 temperature increases to 117° C., there is an internal temperature of the lithium cell 10 of about 130° C. then the shutdown separator 24 shuts down the lithium cell 10.

The lithium cell 10 temperature starts to cool down once the shutdown occurs. The temperature in the lithium cell 10 never approaches 180° C., which is the point when the lithium anode 30 becomes reactive. In the unlikely event of a shutdown with the shutdown separator 24, the cell is no longer usable.

If the lithium cell 10 starts to heat up due to an internal short circuit, the shutdown separator 24 operates in the same way as with an external short circuit. This limits the increase in temperature in the lithium cell 10 and prevents the ignition of the electrolyte, thus meeting the requirement of UN Safety Test T4.

Once the shutdown separator 24 has changed to the non-porous state, as can be seen in FIG. 9, the lithium cell 10 can no longer supply significant power but, to produce an internal short circuit and the consequent internal heating, the lithium cell 10 must be crushed and mechanically abused. The shut-down feature is a desirable characteristic that prevents hazards during subsequent handling and disposal.

The burst disc assembly 32 as shown in FIGS. 3–5 enables filling of the electrolyte into the lithium cell 10. As can be seen in FIG. 3 the burst disc assembly 32 is mounted on the support ring 33 with a filling tube 20 integrally mounted in the burst disc assembly 32. The burst disc assembly 32 is joined by a projection weld 34 to the support ring 33. The filling tube 20 is joined to the burst disc assembly 32 by a projection weld 34.

The burst disc assembly 32 includes burst ring 38 to enable the burst disc assembly 32 to burst at a pressure which is chosen to insure safety and compliance with the above mentioned Short Circuit Test T4.

As can be seen in FIG. 4 the lithium cell 10 can be filled through the filling tube 20. The filling tube 20 in its crimped and cut embodiment 35 as shown in FIG. 5 safely retains the electrolyte. As shown in FIGS. 1 and 5 a negative end cap 18 is mounted on the underside of the support ring 33 forming a cavity 31 beneath the lithium cell 10. The negative end cap 18 includes a round opening 19 adjacent the crimp 35.

The negative end cap 18 serves as an electric contact for the lithium cell 10. The round opening 19 of the negative end cap 18 also enables normal movement and protection to the crimped and cut filling tube 35. Within the cavity 31, such as for pressure changes. The negative end cap 18 also protects the crimped and cut filling tube 35 against physical abuse in use. Under conditions of stress, if the burst disc assembly 32 does burst particles are restrained within the negative end cap cavity 31 without risk of a fire and in compliance with the UN Recommendations. The end cap opening 19 then functions as a ventilation port.

The lithium cell 10 as shown and described incorporates all the features to allow, the lithium cell 10, at least as a D cell, to pass the UN Manual of Tests and Criteria, Part III, sub-section 38.3 Safety Tests T1 through T6 and be transported as non-hazardous and provide a safe product to use for high performance use particularly as flashlights.

The terms and expressions which are employed are used as terms of description; it is recognized, though, that various modifications are possible.

It is also understood the following claims are intended to cover all of the generic and specific features of the invention herein described; and all statements of the scope of the invention which as a matter of language, might fall therebetween.

What is claimed is:

1. A lithium manganese dioxide battery, the battery including a cylindrical can, a first contact positioned at one end of the can and a second contact positioned at the other end of the can, one of the contacts being electrically isolated from the can, the second contact including a ventilation port, a resetable positive temperature coefficient fuse, the fuse being positioned behind the first contact, whereby the fuse is inaccessible to being bypassed with an implement inserted though the ventilation port.

2. A lithium manganese dioxide battery as constructed in accordance with claim 1 wherein the first contact projects from the one end of the can.

3. A lithium manganese dioxide battery as constructed in accordance with claim 1 wherein the first contact comprises the one contact electrically isolated from the can.

4. A lithium manganese dioxide battery as constructed in accordance with claim 1 wherein the second contact comprises an end cap, portions of the end cap forming a cavity, the ventilation port extending into the cavity.

5. A lithium manganese dioxide battery as constructed in accordance with claim 4 further including a burst disc assembly positioned at the other end of the can in communication with the cavity.

6. A lithium manganese dioxide battery as constructed in accordance with claim 5 further including a support ring interconnecting the burst disc assembly and the can.

7. A lithium manganese dioxide battery as constructed in accordance with claim 5 further including an electrolyte fill tube extending from the burst disc assembly, the fill tube being registered with the ventilation port.

8. A lithium manganese dioxide battery as constructed in accordance with claim 3 wherein the first contact comprises a positive contact and the second contact comprises a negative contact.

9. A lithium manganese dioxide battery as constructed in accordance with claim 1 further including a cathode, an anode and a temperature responsive shutdown separator positioned therebetween, the shutdown separator exhibiting increased resistivity in the presence of elevated temperatures.

10. A lithium manganese dioxide battery as constructed in accordance with claim 8, the battery further including a cathode, an anode and an anode tag, the fuse being within a circuit electrically interconnecting the positive contact with the cathode and the anode tag being within a circuit electrically interconnecting the anode with the negative contact.

11. A lithium cell, the cell comprising a cylindrical housing, a pressure relief device adjacent one end of the housing, a positive temperature coefficient fuse within the housing positioned remote from the pressure relief device and adjacent the other end of the housing, the cell further including a housing end cap having a ventilation port proximate the pressure relief device, whereby the ventilation port does not provide access for bypassing the fuse.

12. A lithium cell as constructed in accordance with claim 11 wherein at least portions of the end cap are spaced from the pressure relief device thereby defining a cavity, the ventilation port extending into the cavity.

13. A lithium cell as constructed in accordance with claim 11 further including an electrolyte fill tube extending from the pressure relief device and in registration with the ventilation port.

14. A lithium cell as constructed in accordance with claim 11 wherein the end cap comprises a negative contact and the cell further includes a positive contact at the opposite end of the housing, the positive contact being electrically interconnected to the fuse.

15. A lithium cell as constructed in accordance with claim 14 further including an insulator isolating the positive contact from the housing.

16. A method of fabricating a lithium cell from a cylindrical housing having a first contact at one end and a second contact at the other end, a cathode, an anode and a positive temperature coefficient fuse within the housing, a pressure relief device having an electrolyte fill tube adjacent the second contact, the second contact including an opening, the fill tube extending through the opening, the method comprising the steps of:
 a) infusing an organic electrolyte into the housing through the fill tube and
 b) cutting and crimping the fill tube such that it no longer extends through the opening.

17. A method of fabricating a lithium cell in accordance with claim 16 further including the step of positioning the positive temperature coefficient fuse adjacent the first contact and in electrical communication therewith prior to performing step a).

* * * * *